INVENTORS
RICHARD J. RUNGE
ALBERT E. WORTHINGTON
SULHI H. YUNGUL

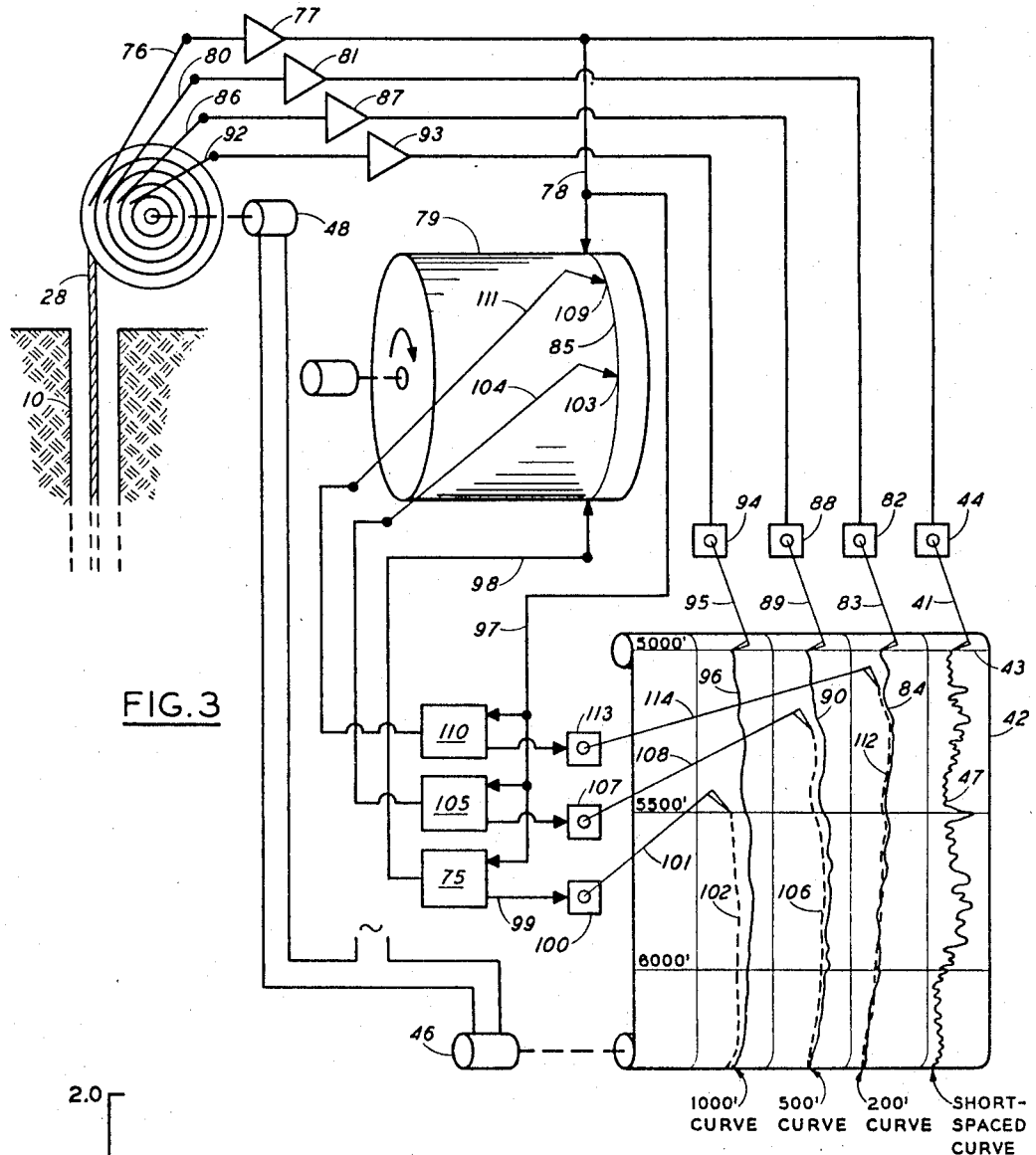
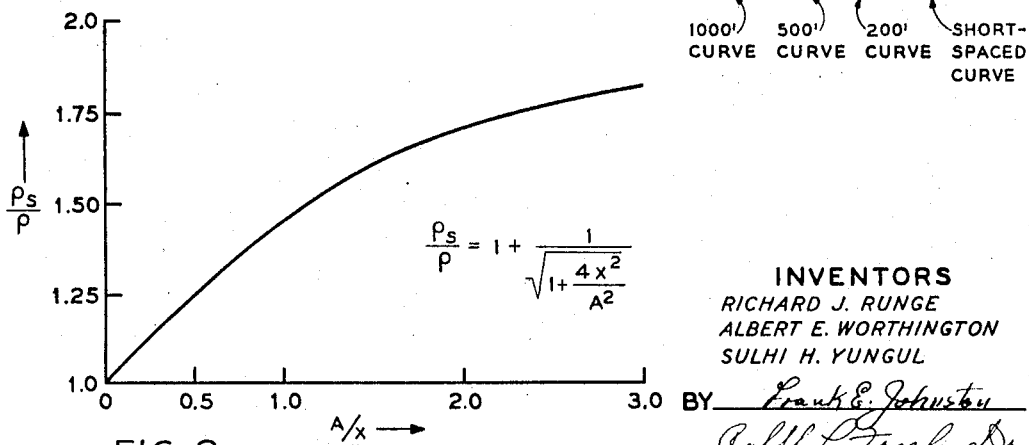

BY *Frank E. Johnston*
*Ralph L. Freeland Jr.*
ATTORNEYS 3,256,480
METHOD OF DETECTING GEOLOGICALLY ANOMALOUS BODIES LATERAL TO A WELL BORE BY COMPARING ELECTRICAL RESISTIVITY MEASUREMENTS MADE USING SHORT-SPACED AND LONG-SPACED ELECTRODE SYSTEMS
Richard J. Runge, Anaheim, Albert E. Worthington, Laguna Beach, and Sulhi H. Yungul, La Habra, Calif., assignors to Chevron Research Company, a corporation of Delaware
Filed Mar. 29, 1965, Ser. No. 446,474
8 Claims. (Cl. 324—10)

This application is a continuation-in-part of our application Serial No. 220,810, filed August 31, 1962.

The present invention relates to electrical prospecting. More particularly, it relates to locating the flanks of a salt dome from a well bore drilled through earth formations adjacent to a salt dome.

It is an object of this invention to indicate the distance to the side of a salt dome, or other electrically resistive geological anomalous bodies, by a sequence of electrical measurements in a well bore that is located from a few feet to many thousands of feet away from the salt dome or body.

In drilling oil wells in the Gulf Coast, it is known that many oil accumulations are in the vicinity of the flanks or sides of salt domes. While the general location of the salt dome is known from surface exploration, the exact location of its sides is not known. Sometimes a well will be drilled at a location believed to be near the side of a salt dome, but it will in fact be as much as a half mile away from the side of the salt dome.

In accordance with the present invention, a method has been found whereby the distance to the side of a salt dome may be determined from measurements inside a "dry" hole, so that a subsequent well may be located at a more favorable distance to reach the oil accumulations around the salt dome. It may also be used in potentially productive wells, when the distance to the side of the dome is unknown. Our novel procedure, as it involves the use of electric currents and potential measurements, may thereby bear a superficial resemblance to electrical prospecting on the earth's surface and electrical logging in wells. However, our procedure is distinct from anything known heretofore.

In surface electrical prospecting, it has been common to use a pair of current electrodes that contact the surface of the earth at two spaced points. An electrical potential difference results from current flow between these electrodes and is measured by other suitably spaced potential electrodes also located on the surface. This potential difference is modified by the resistivity of the earth between and around the electrodes. It has also been proposed to position one of the current electrodes in a deep well bore and then measure the potential distribution at points on the surface around the vicinity of the well with the potential-measuring electrodes. While the measurement may be made with the current electrode at several different levels in the well bore, the potentials are measured on the earth's surface and not in or along the well bore.

In electrical well logging, electrodes are pulled through a well at constant distances from each other and in the range of one to 20 feet apart. In the more popular forms of electric logging, a single current electrode moves with three or four potential-measuring electrodes spaced in varying distances. The common distances are 16 inches, 64 inches, and 18⅔ feet. Well logging methods have been used to investigate changes in the resistivity between individual earth formations, normally shales or sands, to distinguish the amount and kind of fluid in the formation, and to give some indication of the lithologic character of the rock. While this art is highly developed, these methods have not been, and cannot be, used to detect the presence of, or the proximity to, bodies such as salt domes, except when the well bore itself actually penetrates such a body.

The method of this invention comprises, simultaneously or sequentially:

(1) measuring the resistivities of the formations surrounding the well bore by using short-spaced electrodes or by using other conventional short-range logging methods, such as the induction log;

(2) measuring the resistivities of the formations surrounding the well bore by using long-spaced electrodes;

(3) averaging the resistivities measured with the short-spaced electrodes, or short range logging tools such as the induction log, the averages being taken over distances equal to or greater than the long electrode spacings, to indicate the values that would have been expected to be measured using the long-spaced electrodes; and (4) comparing the above indicated apparent resistivities for long electrode measurements with the actually measured long-spaced resistivities, a significant disparity being an indication that the formations immediately surrounding the well bore, whose resistivities were sensed by the short-spaced electrodes, are not representative of the lateral extensions of those formations at distances from the well bore of the order of the long electrode spacings.

If there is a significant difference between the indicated apparent resistivities and the actually measured large-scale resistivities, the difference indicates that the formations surrounding the borehole are not effectively uniform in resistivity to an unlimited horizontal extent. In particular, if the measured large-scale resistivity is larger than the suitably averaged small-scale resistivity indicates it should be, it may be concluded that the formations surrounding the well bore are interrupted by a body of relatively higher resistivity within some horizontal distance from the well bore that is less than or of the order of the electrode separation used in the large-scale measurements.

Throughout the above description wherever reference is made to the measuring resistivity, it is permissible to measure and use conductivities in the computation, if one keeps in mind that there is a mutual reciprocal relationship between resistivity and conductivity and performs the averaging in the mathematically correct manner.

In a geographical region in which salt domes are known to occur, and in a situation in which other data, e.g., gravimetric data, indicate the general proximity of a salt dome, the indicated body of relatively higher resistivity may reasonably be assumed to be the salt dome. Furthermore, the actual distance to the salt dome may be estimated from the ratio between the observed and calculated large-scale resistivity measurements.

While the foregoing explanation of the method is useful as a generalized description of our method, admittedly it is an oversimplification; in particular, it is important to appreciate that the averaging must be carried out in a mathematically precise manner, as will be explained in the following, and that allowance must be made for the over-all anisotropy of the earth caused by both the heterogeneous layering of beds of different resistivities and by the microscopic anisotropy of the individual, otherwise heterogeneous beds.

Historically, the methods used to interpret the results of electric logging have always been refinements on an initial simple first order theory; in such theory the presence of the borehole and the layering of the earth are usually ignored, and calculations of the apparent resistivity are based on assuming all electrodes to be immersed in a continuous homogeneous isotropic and locally infinite earth. In this invention, the first order theory serving as a basis for the discussion of the general principles involved is necessarily somewhat more complex and consists of a geophysical model wherein the actual random heterogeneous and anisotropic conducting earth has been replaced, to first order, by a homogeneous but anisotropic medium whose conductivity components, both vertical and horizontal, are simple arithmetic averages of the corresponding conductivity components of the actual earth. In such a first order theory, the potential at a point or potential difference between two points, when a source of current is present at a third position, can be calculated by using the formula for the electric potential due to a point current source in a homogeneous anisotropic medium.

A further simplification is invoked in constructing this theory by assuming that (except for the presence of the large structure being prospected for) the lateral variation of electrical parameters is negligible; hence, averaging of conductivity components throughout the medium consists in averaging over the vertical variation of these components. It will be assumed in the following that only a vertical variation is of significance, with no significant lateral or azimuthal variation in electrical parameters.

Thus, within the framework of such a first order theory, the necessary quantities needed to obtain the potential at a point (and hence the potential difference between two points) are:

(a) The geometrical coordinates of the points involved,
(b) the total electric current leaving the point source,
(c) the average horizontal conductivity, $\bar{\sigma}_H$ (taken in vertical variation), and
(d) the average vertical resistivity, $\bar{\rho}_V$ (taken in vertical variation).

In such a homogeneous anistropic medium, the electrical potential due to a point source of current I in the well bore, evaluated at a distance Z above or below this source, and at a radial distance r away from the well, is given by $\phi_0(r, Z)$ where (1) $$\phi_0(r, Z) = \frac{I\sqrt{\bar{\rho}_V/\bar{\sigma}_H}}{4\pi\sqrt{r^2 + \lambda_T^2 Z^2}}$$

Equation (1) neglects the effect of the borehole fluid as a significant conducting path. In equation (1), $\lambda_T^2$ is the square of the total anistropy, which includes the effects of both layering (bedding) anisotropy and microanisotropy (point anisotropy). It is given by (2) $$\lambda_T^2 = \bar{\rho}_V \bar{\sigma}_H$$

In using the simple first order theory to interpret long-spacing potential difference measurements, a difficulty arises in connection with evaluating the average vertical resistivity, $\bar{\rho}_V$. The paradox of resistivity states that in an anisotropic medium with vertical and lateral components of resistivity, measurements of potential differences in a vertical borehole for the case of a point source in the borehole (neglecting the borehole itself) will suffice only to determine the lateral or horizontal resistivity and will not depend on the vertical component. Conventional short-span electric logging methods, generally speaking, measure either $\sigma_H$ or $\rho_H$ and not $\rho_V$, that is to say the lateral components only.

In lieu of any information concerning $\rho_V$, one can take, instead of $\bar{\rho}_V$, the approximation (3) $$\bar{\rho}_V \approx \bar{\rho}_H$$

In such a case, $\lambda_T^2$ is replaced by the approximate expression, (4) $$\lambda_T^2 \approx \bar{\rho}_H \bar{\sigma}_H$$

and it is understood that the average $\bar{\rho}_H$ is obtained by averaging the reciprocals of the values of $\sigma_H$, should these latter be directly obtainable from the short-span electric logging, as with an induction log.

Additional sources of information from well logs taken in the same and any adjacent wells may be used to estimate more closely the local anisotropy, $\lambda(Z)$, of sediments at depth Z. In such cases, $\rho_V$ can be directly obtained from $\rho_H$ or $\sigma_H$. Other estimates, less detailed in character, can similarly be made for the ratio of $\rho_V$ to $\bar{\rho}_H$. These considerations are based on information from coring the sections involved or from other logging measurements which indicate the relative fractions of different kinds of rock present in the earth sections involved; this information can in turn be used to estimate the magnitude of local anisotropy, $\lambda(Z)$, in a particular bed.

Further objects and advantages of the present invention will become apparent from the following detailed description of the method and its application.

In the drawings:

FIGURE 2 is a curve illustrating the reason for spacing the several long-spaced electrodes at intervals that are from two to three times the distance of the next adjacent measuring electrode to the current electrode.

FIGURE 3 is an alternate arrangement for obtaining the average apparent electrical resistivity of formations traversed by the well bore over an elongated portion of the geological column.

Figure 1:
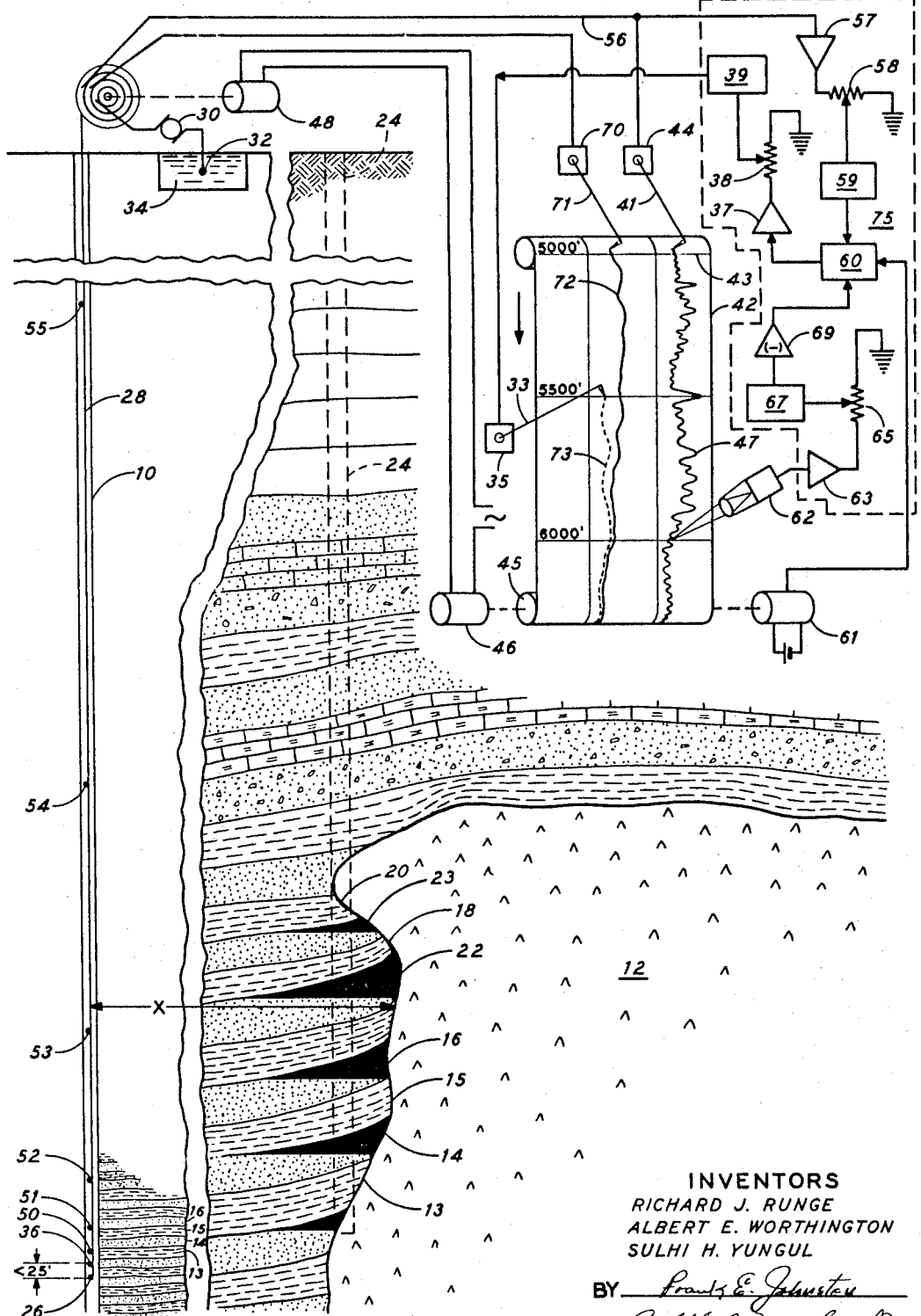
FIGURE 1 is a schematic representation of the method of exploring for salt domes laterally from a well bore by the present invention, including one form of apparatus for averaging the apparent electrical resistivity of the short-spaced potential electrode over the same distance as any one of the long-spaced electrodes.

Referring now to the drawings, and particularly to FIGURE 1, there is indicated a well bore 10 that has missed the side of a salt dome 12 by an unknown distance $X_0$. This distance $X_0$ is sufficiently great so that oil that normally has accumulated in porous formations, such as 14 and 16, is not contained in the formations where well bore 10 traverses them. As also indicated schematically, these beds 14 and 16 are usually deformed in an upward direction by the intrusion of salt dome 12, so that oil is able to accumulate along the flank 18 of salt dome 12. In practice, the distance $X_0$ may vary from 250 feet to half a mile. The general location of salt dome 12 is known from gravity and seismic exploration data. However, flank 18 will normally be irregular, so that its exact location is difficult to determine from the earth's surface. It will also at times include a protrusion like that indicated by the numeral 20. Protrusion 20 also assists the accumulation of oil in beds, such as 22 and 23.

With well bore 10 known to be dry, it is the purpose of the present invention to indicate the distance $X_0$ so that another well bore, such as that indicated by the dotted lines 24, may be drilled directly into the oil-producing section of formations 14, 16, and 22. To make the necessary measurements, current electrode 26 is supported on the lower end of logging cable 28. It is supplied with power by a D.C. or low-frequency A.C. source, indicated as generator 30. Electrical current flow is completed through the earth by a ground connection electrode 32, indicated as immersed in the drilling fluid pit 34 at the earth's surface.

In accordance with conventional electrical logging techniques, where it is only desired to determine the relative changes in resistivity of the adjacent formations such as from 13 to 14 and 14 to 15, one or more potential-measuring electrodes 36 is supported on cable 28 at a distance of from one to 25 feet from current electrode 26.

In the embodiment of FIGURE 1, electrode 36 measures a potential in the well bore in the vicinity of current electrode 26, and this potential is recorded on chart 42 by pen 41 driven by galvanometer 44. As is well known in the electric logging art, the magnitude of the potential observed by electrode 36 is linearly related to the resistivity of the earth formation in the vicinity of current electrode 26. Chart 42 is driven forward by roller 45 and motor 46. The rotation of motor 46 is synchronized with the motion of the logging sonde through the borehole by means of cable position indicator 48. Mark 43 on chart 42 coincides with the position of pen 41, and other pens, when the logging sonde is at the depth associated with that mark. In FIGURE 1, mark 43 is shown as signifying a depth of 5000 feet. The trace 47 of pen 41 on chart 42 is thus a record of the resistivity o fa small volume of the earth formations immediately surrounding the borehole, as measured by short-spaced electrode 36. Galvanometer 70 and pen 71 trace a similar curve 72 which is, however, the measure of the resistivity of a larger volume of sediment surrounding the borehole in the vicinity of current electrode 26 as observed by one of the long-spaced electrodes, say 54.

To use curve 72 to indicate the proximity of a salt dome to the borehole, it is necessary to predict what respective values curve 72 would have had if no salt were in the vicinity of the borehole. It has been established (see, for instance, Kunz and Moran, Geophysics 23, pp. 770–794, 1958) that so-called "normal" electrode configurations, such as those described herein, measure the horizontal component of resistivity in a formation. If the formation is anisotropic in resistivity, either by virtue of the microscopic structure of the rocks or by virtue of horizontal layering of formations of varying resistivity, then each of the potential electrodes records a curve corresponding to the average horizontal resistivity of a section of formation approximately equal in thickness to the spacing of the respective electrode from the current electrode. The effective average horizontal resistivity of such a group of horizontally layered conductors is not the depth-average resistivity, but rather the reciprocal of the depth-average conductivity, which reciprocal can also be called the harmonic depth-average resistivity. To obtain the effective average horizontal resistivity instrumentally, it is convenient first to produce a depth-average of the conductivities of the individual formations, and then to invert this quantity to produce its reciprocal, in short, to "reciprocate" the quantity. The reciprocal is the desired depth-average formation resistivity. These indicated operations are performed on the measurements obtained by the short-spaced curve in order to obtain a predicted value for the long-spaced curve.

Referring again to FIGURE 1, curve 73 is the depth-average resistivity produced from the values composing curve 47. In accordance with previous description, curve 73 represents the value of resistivity that would have been recorded on curve 72 if no salt dome were within the region by which the long-spaced electrode is influenced.

Curve 73 is obtained in the following manner. The potential measured by short-spaced electrode 36 and carried on cable lead 56 is applied to amplifier 57. Potentiometer 58 is used to obtain an appropriate scaling factor, and the resulting signal is sent to reciprocator 59, which is merely an analog divider, dividing unity by the quantity fed into it. The reciprocated signal is then led to integrator 60, the signal being the integrand, and the variable of integration being the depth, which is translated into a voltage by potentiometer 61. Also into the integrator 60 is fed another signal from the part of curve 47 which was recorded at a previous, lower depth (the log being taken as the sonde rises). The lower depth signal is subtracted, whereas the upper depth signal is added, so that the resulting integral is proportional to a running average between the two depths. The lower-depth resistivity is read off curve 47 by optical curve follower 62. The signal from curve follower 62 is fed to amplifier 63, and the output of amplifier 63 in turn is fed to scaling potentiometer 65. The signal from potentiometer 65 then goes to reciprocator 67 and through sign-changing amplifier 69, so that it is fed subtractively into integrator 60. The running depth-average between the two depths, shown as 5000 and 6000 feet in FIGURE 1, is represented by the output voltage from integrator 60. This voltage is fed to amplifier 37 and potentiometer 38 for scaling purposes, and then to reciprocator 39 for the final inversion; the final voltage is thus the effective average resistivity and represents the inverted value of the average reciprocal resistivity, or average conductivity, over the whole depth interval between 5000 and 6000 feet. The signal representing the effective average resistivity is fed to galvanometer 35 and is plotted on chart 42 by pen 33 at depth 5500 feet.

Scaling potentiometer 38 is adjusted so that curve 73 would coincide with curve 72 if there were no salt within the region influencing the signal from the long-spaced electrode 54. If salt or other massive resistive material is within that region, curve 73 shows a lower resistivity than curve 72.

As to the magnitude of the difference to be expected between curves 72 and 73, it is apparent that the greatest difference will be seen when a wall of highly resistive salt is very near to the borehole. Such a wall effectively blocks out nearly half of the available formation through which the logging current might flow. The resistivity apparent to a long-spaced electrode configuration that senses the salt is almost twice the resistivity apparent to a short-spaced configuration that does not sense the salt. In such a case, curve 72 shows values almost twice as high as those of curve 73 at the same depth if salt is sensed. For cases in which the salt is not so close to the well, it is necessary to apply the first order theory discussed above to determine the well to salt distance.

The apparent resistivity can be determined from the first order theory for all cases where electric potentials are measured by any of the electrodes 36 or 50 through 54, spaced a distance A from current electrode 26 by substituting $r=0$ into Equation (1) of the first order theory, namely, $$(5) \qquad \phi_0(0, A) = \frac{I}{4\pi\sigma_H A}$$

In Equation (5), the apparent resistivity is taken to be the factor on the right side other than $I/4\pi A$, in accordance with the general formula (6) Apparent resistivity =
$$\frac{4\pi(\text{interelectrode distance}) \cdot (\text{potential})}{\text{current strength}}$$

Applying (6) to (5), we obtain that for no salt present the predicted apparent resistivity $\rho$ is $\rho = 1/\bar{\sigma}_H$.

A salt flank a distance $X_0$ away from and parallel to the well bore acts as an insulating barrier and leads to a potential from Equation (1) given by $$(7) \qquad \phi_{\text{salt}}(0, A) = \frac{I}{4\pi\sigma_H A}\left(1 + \frac{1}{\sqrt{1+4X_0^2/\lambda_T^2 A^2}}\right)$$

Applying (6) to (7) yields the result that the apparent resistivity $\rho_s$ in this case is $$(8) \qquad \rho_s = \frac{1}{\bar{\sigma}_H}\left(1 + \frac{1}{\sqrt{1+4X^2/A^2}}\right)$$

where the apparent distance $X = X_0/\lambda_T$. Taking the ratio of $\rho_s$ of Equation (8) to $\rho = 1/\bar{\sigma}_H$ yields Equation (9), $$(9) \qquad \frac{\rho_s}{\rho} = 1 + \frac{1}{\sqrt{1+\frac{4X^2}{A^2}}}$$

where:

$\rho_s$ = the apparent resistivity from (6) measured in the presence of salt.

$\rho$ = the apparent resistivity from the first order theory measured in the absence of salt = $1/\bar{\sigma}_H$.

$X$ = the apparent distance from the borehole to the salt face.

$X_0$ = the actual distance between the borehole and salt face, $X_0 = X\lambda_T$.

and $A$ = the spacing between the current electrode 26 and the long-spaced electrode 54.

If the salt is located so that it exerts no effect on the short-spaced measurements or any short span log used to obtain $\bar{\sigma}_H$ but pronouncedly affects the long-spaced measurements, then from the ratio of resistivities interpreted with the aid of Equation (9), it is possible to estimate the distance to the salt flank within the uncertainty in measuring $\lambda_T$. Now referring again to Kunz and Moran (ibid.) it will be seen that values for the microanisotropy in excess of 2 are unlikely even in the more anisotropic beds, such as shales. Furthermore, it is possible to calculate precisely the anisotropy contribution arising from the heterogeneous layering of beds of different $\sigma_H$. Consequently, $\lambda_T$ can be estimated with some accuracy, in fact, to within 50% without extensive information beyond that available from the log. Even in the more extreme case where $\lambda_T$ is known with an accuracy no better than a factor of 2, $X_0$ is then known to within this same factor. While such an uncertainty might render some logging measurements of little value, in this special case knowledge of the distance of the salt within a factor of 2 is more than adequate. For instance, if the salt flank is calculated to be 100 ft. away, it does not much matter whether it is 50 feet or 200 feet, in neither case is there an opportunity for a commercially significant oil accumulation to lie within a dry hole and the salt flank. On the other hand, a determination of the salt at 1000 feet with an uncertainty of 2 would warrant further exploration or drilling. Thus, even in the case of extreme uncertainty in $\lambda_T$, the present method can still be applied to produce a commercially useful result.

Consideration of some of the practical implications of Equation (9) shows the meaningful calculations of the well-to-salt distance can be made only if the ratio of the long electrode spacing to that distance is within a certain range. This may be understood by reference to FIGURE 2, which graphically represents Equation (9). In the first place, the curve of the resistivity ratio flattens out and becomes asymptotic to the value 2 at large values of the ratio of electrode spacing to distance. This means that large changes in the well-to-salt distance are represented by only small changes in the measured resistivity ratio. In practice, of course, the resistivity ratio cannot be measured to high accuracy. It is not reasonable to expect an accuracy of better than 10%. The graph of FIGURE 2 shows that with a 10% uncertainty there would be little use to attempt a distance calculation if the electrode spacing were larger than, say, three times the apparent well-to-salt distance. The curve is too flat for values of $A/X$ larger than 3.

Referring now to the lower end of the curve of FIGURE 2, evidently a 10% change in the measured resistivity ratio in the region from 1.1 down to unity could signify a change in a calculated value of apparent well-to-salt distance from about four times the electrode spacing to infinity. Obviously, calculations in that region would be subject to doubt.

With the above considerations in mind, it is reasonable to choose a desirable operating range for the ratio $A/X$ (the electrode spacing over the apparent well-to-salt distance). The limits of the range must of course be somewhat arbitrary, but the lower limit should be significantly larger than 0.25, say 0.50; and the upper limit should be smaller than 3.0, say 2.0. Now, if the ratio of the electrode spacing to the apparent well-to-salt distance is never to be larger than 2, nor smaller than 0.5, and if the apparent well-to-salt distance is unknown, it is necessary to make measurements with more than one pair of electrodes, and in fact a series of electrodes with successive spacings in geometric progression will produce this result, if each spacing is four times the next smaller spacing. Actually, it is reasonably convenient to use even smaller ratios between successive spacings, ratios of only 2.0 to 2.5. A convenient set of long spacings is, for example: 50, 100, 200, 500, 1000 and 200 feet.

There will now be described another embodiment of this invention illustrating a different way of handling at the surface the information from the logging sonde in the borehole, and also illustrating the handling of more than two long-spaced potential-measuring (resistivity-measuring) electrodes. For the purpose of this discussion it is convenient to assume $\lambda_T$ to be unity.

Refer now to FIGURE 3. In order to simplify the description, some of the separate information-processing units shown in FIGURES 1 have been combined into composite devices in FIGURE 3. For example, composite unit 75, shown merely as a three-terminal box, represents an entire collection of components such as those shown in the upper right hand corner of FIGURE 1: reciprocators 39, 59, and 67; amplifiers 57, 37, 63, and 69; potentiometers 58, 38, and 65; and integrator 60. The previous description will be relied upon to indicate that a composite unit can accept two voltages representing (1) a present value of signal and (2) a previously recorded value of the same signal; and that the composite unit can give out a voltage representing the running harmonic average of the given signal between the given values.

Also, for purposes of simplification FIGURE 3 shows only three long-spaced resistivity values and one short-spaced value being recorded. (As mentioned a few paragraphs above, a feasible practical arrangement may comprise six long-spaced values.) For illustrative purposes, the long spacing represented by FIGURE 3 are assumed to be 200, 500, and 1000 feet.

In FIGURE 3, the short-spaced resistivity signal is represented as issuing from an electrode in the well bore 10, over cable lead 76, through amplifier 77 to galvanometer 44, actuating pen 41 for recording the short-spaced resistivity curve 47 on chart 42. However, the short-spaced signal also proceeds through lead 78 to be recorded on magnetic drum 79. Drum 79 is of a type commonly used in computing and data processing equipment. Its surface can be magnetized, or erased, by appropriate magnetic heads. In FIGURE 3, the drum is assumed to rotate in synchronism with the movement of the logging cable in the well (as did the chart in FIGURE 1), so that 180° rotation of the drum represents 1000 feet, 90° represents 500 feet, and 36° represents 200 feet.

In the same way that the short-spaced signal comes up lead 76, the 200-foot-spaced signal comes up lead 80, is fed through amplifier 81, and actuates galvanometer 82 and pen 83 to produce trace 84. The 500-foot-spaced signal comes up lead 86 to amplifier 87 and goes on to galvanometer 88, actuating pen 89 to record trace 90 on chart 42. The 1000-foot-spaced signal comes up lead 92 through amplifier 93 and goes on to galvanometer 94 to actuate pen 95.

Three of the above-mentioned composite units are shown in FIGURE 3, each of them for the purpose of making a running average of the short-spaced signal to plot alongside its respective long-spaced curve. Composite unit 75 is shown receiving the presently incoming short-spaced signal through lead 97, and also receiving the short-spaced signal that was recorded 1000 feet below the present depth, 180° around on the magnetic drum through lead 98. The present signal is added and the previous signal is subtracted in a running integration as described hereinbefore, and the resulting properly averaged value is fed out of composite unit 75 through lead 99 to galvanometer 100 to activate pen 101 for trace 102, the 1000-foot average of the short-spaced curve, for comparison with the actually measured 1000-foot curve 96.

In a similar manner the recorded short-spaced signal is read off the magnetic drum at the 90° position 103, representing a depth difference of 500 feet; the signal is fed through lead 104 to composite unit 105. Also into unit 105 goes the present signal through lead 97. Just as composite unit 75 gave out a running average over 1000 feet, so does composite unit 105 give a running average over 500 feet, and the value of this average is plotted on chart 42 as curve 106 by means of galvanometer 107 and pen 108.

Also, in a similar manner the recorded short-spaced signal is read off the magnetic drum at the 36° position 109, representing a depth difference of 200 feet; the signal is fed through lead 111 to composite unit 110. Also into unit 110 goes the present signal through lead 97. Out of unit 110 comes a running average over 200 feet, and the value of this average is plotted on chart 42 as curve 112 by galvanometer 113 and pen 114.

Referring now to the various plotted curves on chart 42, in the light of the explanations above, an illustration of their application to distance measurements will be made.

It will be noted that the 200-foot curve 84 shows no significant excess above the averaged short-spaced curve 112. This indicates that, if there is a salt dome in the vicinity, its nearest side is much more than 200 feet away. The 500-foot curve 90 shows no significant excess at depths greater than 6000 feet, but it appears to have a meaningful excess over the corresponding averaged short-spaced curve 106 at less than 6000 feet. The excess is approximately, say, 20%; and assuming that this excess is meaningful, one can refer to FIGURE 2 to deduce that a 20% excess corresponds to a ratio of electrode spacing to salt distance of about 0.4, so that it is now inferred that at depths from 5000 feet to 5500 feet, the well is about 1200 feet away from a salt dome ($500 \times 1/0.4 = 1250$). Confirmation of this estimate then appears on the 1000-foot curve, which shows a significant excess over the correspondingly averaged short-spaced curve 102, even at the greatest depth shown (approximately 6500 feet), and curve 102 shows a definite excess of, say, 40% at 5500 feet. With the aid of FIGURE 2, one estimates that at 5500 feet the wall of a salt dome is about 1000 feet away ($1000 \times 1 = 1000$). Assuming that all of the data is meaningful, one can thus infer that a salt dome protrusion as shown in FIGURE 1 is being detected, that it is of the order of a thousand feet away from the well at depths between 5000 and 6000 feet, and that it is farther away at the lower part of the dome.

The above-described embodiments have comprised computing equipment of the so-called analog type that handles continuously varying voltages. It is possible to carry out the steps of the present invention using digital equipment that handles discrete voltage readings. Indeed, digital processing of the information has certain inherent advantages. In particular, digital handling is by nature more adaptable to handling signals that come in interrupted fashion, such as the signals obtained when it is necessary to bring two or more messages up on one cable lead, and time must be shared between them. A digital processing arrangement is shown schematically in FIGURE 4.

Figure 4:
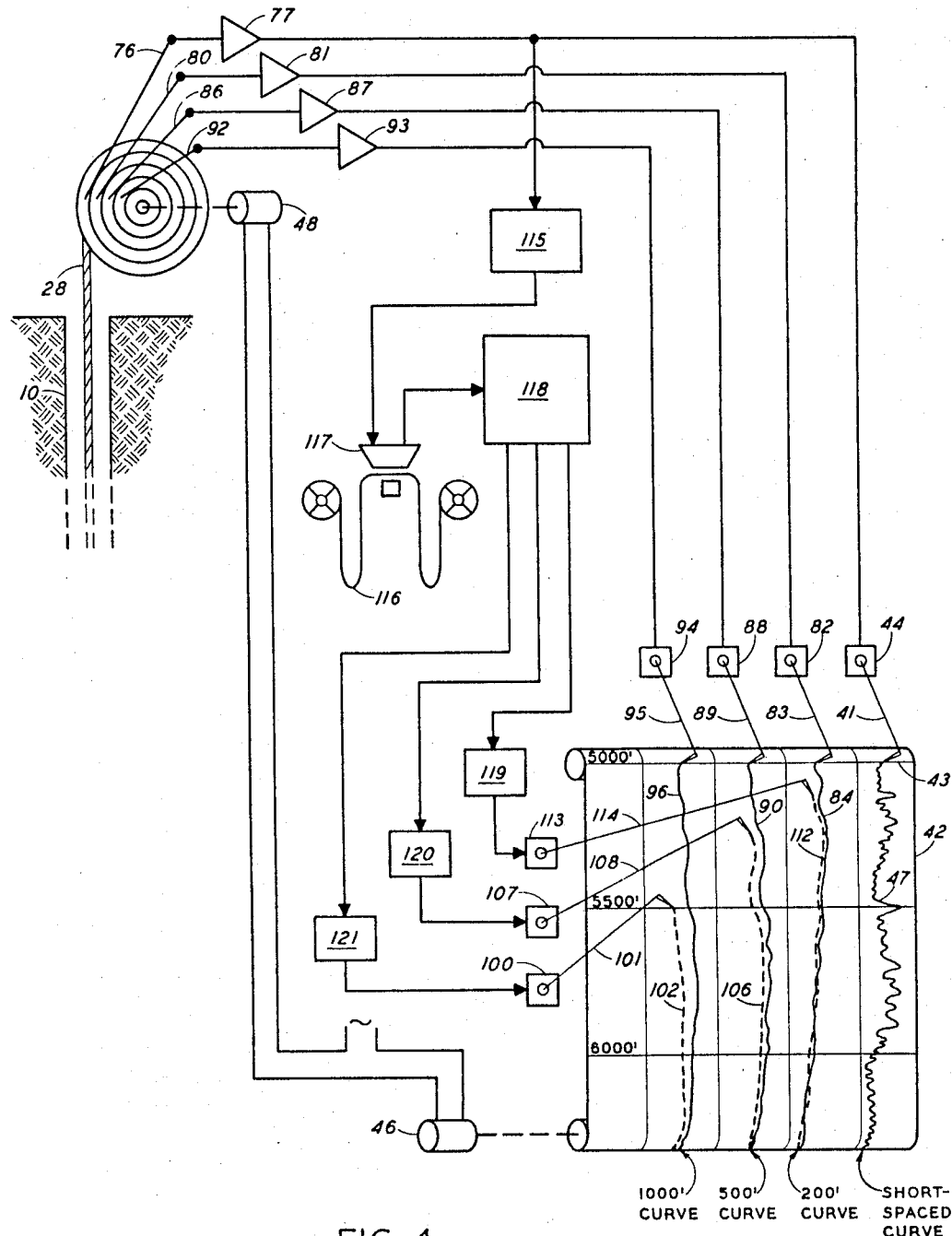
FIGURE 4 is another embodiment to average apparent electrical resistivity from a short-spaced potential electrode that uses a digital recorder and processing system.

In FIGURE 4, as in FIGURE 3, the signal from the short-spaced electrode comes up cable lead 76 through amplifier 77. But in FIGURE 4, the amplified short-spaced signal is fed into a digital voltmeter 115. Signals from the long-spaced, 200-foot, 500-foot, and 1000-foot electrodes come up cable leads 80, 86, and 92, respectively, and are fed into amplifiers 81, 87, and 93, respectively, as before.

The digital voltages from meter 115 are recorded on tape 116 by magnetic recording and reading head 117. They are then fed immediately, or at a desired later time, into digital computer 118, which forms the reciprocal of each discrete voltage reading, sums the reciprocals over the desired depth-averaging interval, forms the reciprocal of the sum, and transmits that result to the appropriate digital-to-analog converter.

In FIGURE 4, three digital-to-analog converters are indicated: 119 for handling the 200-foot average, 120 for handling the 500-foot average, and 121 for handling the 1000-foot average. Converter 119 feeds into galvanometer 113 to plot the 200-foot average curve, as described hereinbefore in connection with the previous embodiment. Likewise, converter 120 feeds into galvanometer 107, and converter 121 feeds into galvanometer 100. Beyond the galvanometers 113, 107, and 100 the components and their functions are similar to those described in connection with FIGURE 3.

A further advantage can be taken of digital recording to account for the effect of $\lambda_T$ on the calculation of the distance to the salt flank, so that the same recording and computing equipment may be used to calculate a running value of $\lambda_T$. A convenient way to perform this calculation is to record continuously the value of the self-potential curve on tape 116 and use computer 118 to determine therefrom the boundaries of each bed in a sand-shale lithology. This information, combined by the computer with the measured horizontal resistivity of each bed and with a predetermined and preset value for microanistropy in each type of lithology, permits plotting of $\lambda_T$ directly on chart 42, thus facilitating a more precise estimate of the distance to the salt.

As mentioned briefly above, it is sometimes desirable, for efficiency, to use one or more of the leads of a logging cable to bring up multiple signals, that is, signals from more than one electrode. In such a case a time-sharing method can be used, such as is described in at least two U.S. Patents: 2,779,912 to H. C. Waters, and 2,917,704 to J. J. Arps. For the purposes of the present invention, it may be noted that the voltages from the various electrodes of different spacings need to be sampled at different time or distance intervals as the logging sonde is pulled up the well bore. In terms of distance, it is desirable to sample the voltage of the short-spaced electrode about every foot. The voltage from a 200-foot electrode need be sampled only, say, every 50 feet; that of the 500-foot electrode, say, every 100 feet; and so on. A self-potential curve can also be sent over the cable using such a time sharing system.

It should be noted that the optimum frequency of the current to be used in the long-spaced logging method is not the same in all circumstances. There are two mutually antagonistic requirements that determine the optimum frequency. For purposes of penetrating the formations to great distances, it is desirable that the frequency be as low as possible. However, if the frequency becomes as low as that of the natural telluric currents that are flowing in the earth at the time and place of the logging operation, the telluric potentials become a source of error. We have found that a frequency of the order of one cycle per second is reasonable to use initially; lower frequencies may then be used if the telluric voltage noise permits.

Although all of the above examples of the method have been used to show how to detect a salt dome, the invention can also be used to identify other bodies having a high resistivity contrast. Among the rock formations that have similar high resistivity contrasts to surrounding earth formations are anhydrites, carbonates, and igneous rocks. It is also useful to detect geological structure such as faults that are sealed by minerals that have high resistivities.

In these latter applications of the method, extremes of resistivity contrast may be experienced among the beds penetrated by the well bore. In such cases, the validity of the first order theory depends upon the accuracy with which $\phi_0(r, Z)$ of Equation (1) actually represents the potential in a random heterogeneous anisotropic medium in which a point source is located and for which no lateral nor azimuthal variation in electrical conductivity exists but only a vertical (Z) dependence. The potential $\phi(r, Z)$ in such a case satisfies the equation of electrical continuity away from the source given by

(10)
$$\frac{1}{r}\frac{\alpha}{\alpha r}r\frac{\alpha\phi}{\alpha r}+\frac{1}{\sigma_H(Z)}\frac{\alpha}{\alpha Z}\sigma_V(Z)\frac{\alpha\phi}{\alpha Z}=0$$

A function of type $\phi_0(r, Z)$ of (1) satisfies equation (10) in the limiting situation of constant $\sigma_H$ and $\sigma_V$. Numerical solutions to Equation (10) performed on a computer, have confirmed that an accurate solution to (10) deviates from $\phi_0$ of (1) for reasonably large interelectrode distances by only 1% to 5% for several typical cases in which $\sigma_H(Z)$ was given from field data and $\sigma_V$ was taken equal to $\sigma_H$ (microisotropic case).

Using such numerical techniques, it is possible, given $\sigma_H(Z)$, to ascertain (under the microisotropic assumption) whether or not the first order theory is an adqueate solution to (10) for reasonable interelectrode distances. When the first order theory is not adequate, the above mentioned numerical methods can be used to solve (10) which can then be used as a basis to interpret the long spacing measurements. This higher order theory, of course, requires considerable additional work to interpret quantitatively the approximate location of the body from the well bore, but is sometimes necessary in specialized applications of the method.

Various modifications and changes can be made in practicing the invention without departing from the scope of it. One such change is the step of averaging resistivities of earth formations around the well bore. The resistivity values can be hand-picked from a conventional short-spaced electrode resistivity curve. Instantaneous values are selected at regular intervals of, say, 5 feet. These resistivity values are then reciprocated and added together over a desired interval, such as 500 or 1000 feet. The total is then reciprocated again and the resulting value plotted, by hand, at a depth midway between two extremes of the depth interval. The procedure is repeated by adding the instantaneous value of the next interval of, say, 5 feet, to the total and striking from the total the lowest interval in the previous summation. This second value is then plotted at a height 5 feet above the previous average value. The procedure is repeated over any desired interval to develop a curve such as 73 in FIGURE 1 or 102 in FIGURE 3.

We claim:
1. The method of exploring for salt domes or other highly resistive bodies laterally from a well bore, using at least one current electrode in said well bore to pass current into the formations surrounding the well bore, and detecting potentials at a plurality of potential electrodes in said well bore spaced apart from said current electrode which comprises:
  (a) measuring the resistivities of the formations surrounding the well bore by traversing at least one of said potential electrodes at a short spacing relative to said current electrode over a given depth interval in said well bore,
  (b) measuring over at least the same depth interval the resistivity of the formations surrounding the well bore by using at least one of said potential electrodes at a relatively long spacing relative to said current electrode and spanning at least said depth interval,
  (c) averaging the resistivities measured with said at least one short-spaced potential electrode, the average being taken by summing the individual resistivities at a plurality of locations over said depth interval in said well bore spanned by said long-spaced potential electrode and dividing the sum of said resistivities by the number of said locations to indicate the resistivity value that would be expected to be measured using said at least one long-spaced potential electrode, and
  (d) comparing the averaged short-spaced resistivity value with the actually measured long-spaced resistivity value, a significant disparity in said values being an indication that a body of different resistivity from that of the formations through which the well bore passes exists at a lateral distance from the well bore of the order of the long electrode spacing.

2. The method of claim 1 in which said at least one short-spaced electrode has a spacing of less than 25 feet from said current electrode, and said at least one long-spaced electrode has a spacing of more than 50 feet from said current electrode.

3. The method of claim 1 in which said at least one short-spaced electrode has a spacing less than the spacing of said at least one long-spaced electrode, and said at least one long-spaced electrode has a spacing of more than 50 feet from said current electrode.

4. The method of claim 1 in which a plurality of said long-spaced potential electrodes are used, the ratio of each spacing to its preceding spacing being between 2 and 3.

5. A method for determining the approximate horizonal distance from a well bore penetrating earth formations to the exterior flank of a salt dome rising vertically through said formations, using a current electrode to pass current into the formations surrounding the well bore and a plurality of potential electrodes spaced apart from said current electrode, which method comprises:
  (a) measuring over a given interval of a well bore the resistivities of the formations surrounding the well bore using a plurality of potential electrodes differently spaced in said well bore from the current electrode, the ratio of each longer spacing of said potential electrodes to the preceding shorter spacing of said potential electrodes being between 2 and 3,
  (b) averaging the resistivities measured with at least one of the shorter-spaced of said electrodes, the average being taken by integrating a multiplicity of said resistivities measured with said shorter-spaced electrodes over a depth interval comparable to that interval spanned instantaneously by a longer-spaced electrode to indicate a value proportional to the resistivity that would be expected to be measured with said longer-spaced electrode if no salt dome were present,
  (c) comparing said averaged resistivity value with the resistivity actually measured using said longer-spaced electrode over the same depth interval to determine the disparity between the averaged shorter-spaced resistivity value and the actually measured longer-spaced resistivity value, and
  (d) computing from said disparity the approximate horizontal distance to the exterior flank of said salt dome, in accordance with the formula:

$$\frac{\rho_s}{\rho}=1+\frac{1}{\sqrt{1+\frac{4X^2}{A^2}}}$$

where:
  $\rho_s$ = the resistivity measured in the presence of a salt dome
  $\rho$ = the resistivity measured in the absence of a salt dome
  $X$ = the apparent distance from the borehole to the salt dome face
and
  $A$ = the spacing from said current electrode to said longer-spaced electrode.

6. The method of inferring the presence of a salt dome or other highly resistive body laterally from a well bore which comprises
  (a) traversing the well bore with a current electrode to pass current into the earth formations surrounding said well bore, (b) simultaneously traversing said well bore with a first electrode having an effective spacing that is short relative to said current electrode to detect the resistivity of the earth formations bridged by said electrodes, (c) continuously recording a resistivity curve over a known depth interval in said well bore in accordance with the depth in said well bore of said first short-spaced potential electrode then (d) traversing said known depth interval with a second potential electrode having an effective spacing relative to said current electrode several times longer than the effective spacing between said short-spaced potential electrode and said current electrode, (e) recording the resistivity measured by said long-spaced electrode in accordance with its depth in said well bore, (f) continuously recording the harmonic average of said resistivity curve measured with said short-spaced electrode over a depth interval equal to the effective space between said long-spaced electrode and said current electrode, said harmonic average being made by continuously adding and simultaneously subtracting increments corresponding to the measured resistivity values recorded on said short-spaced resistivity curve, each increment corresponding to at least about the distance between said short-spaced electrode and said current electrode, and (g) displaying said harmonic average of said short-spaced electrode curve adjacent to the recorded long-spaced resistivity curve to indicate significant differences between said curves, said difference indicating that a salt dome or other highly resistive body is at a lateral distance from the well bore that is about equal to the depth interval measured by said long-spaced potential electrode.

7. The method of exploring laterally from a well bore for a salt dome or other body having a different electrical impedance relative to the surrounding earth formations traversed by said well bore, which comprises (a) traversing said well bore with a current source to pass current into the formations surrounding said well bore, (b) measuring an electrical quantity characteristic of the electrical impedance of the formations surrounding the well bore by simultaneously traversing at least one potential detector at a first known spacing from said current source over a given depth interval of said well bore, (c) measuring over at least the same depth interval another electrical quantity characteristic of the electrical impedance of the formations surrounding the well bore by traversing said same interval with a potential detector having a spacing from a current source at least twice said known first spacing, (d) harmonically averaging said electrical quantity characteristic of said electrical impedance measured with said potential detector at said first known spacing from said source, the average being taken by summing the individual values of said measured electrical impedance at a plurality of locations over said depth interval in said well bore spanned by the longer spaced of said potential detectors and dividing the sum of said values by the number of said locations to indicate the value of said electrical impedance that would be expected to be measured using said longer-spaced potential detector, and (e) comparing the average short-spaced value of said electrical impedance with the actual value of said other electrical characteristic measured by said longer-spaced potential detector, a significant disparity in said values being an indication that a body of different electrical impedance from that of the formations through which the well bore passes exists at a lateral distance from the well bore of the order of the longer spacing between said potential detector and said current source.

8. The method of inferring the presence of a salt dome or other highly resistive body laterally from a well bore which comprises (a) traversing the well bore with an electrical source to pass current into the earth formations surrounding said well bore, (b) simultaneously traversing said well bore with a first potential detector having an effective spacing that is short relative to said electrical source to detect the conductivity of the earth formations bridged thereby, (c) continuously recording a conductivity curve over a known depth interval in said well bore in accordance with the depth in said well bore of said first short-spaced potential detector, (d) continuously recording the reciprocal of the harmonic average of said conductivity curve measured with said short-spaced potential detector over a depth interval several times the spacing between said detector and said electrical source, said harmonic average being made by continuously adding and simultaneously subtracting increments corresponding to the measured conductivity values recorded by said conductivity curve, each increment corresponding to at least about the distance between said detector and said source, (e) then, simultaneously traversing said known depth interval of said well bore with a current electrode and a potential electrode system having an effective spacing therebetween that is several times longer than the effective spacing between said first potential detector and said electrical source, (f) recording the resistivity measured by said long-spaced electrode system in accordance with its depth in said well bore, and (g) displaying said reciprocal of the harmonic average of said conductivity measured by said first short-spaced potential detector adjacent to the recorded resistivity curve generated by said long-spaced electrode system to indicate significant differences between said curves, said significant difference indicating that a salt dome or other highly resistive body is at a lateral distance from the well bore that is about equal to the depth interval measured by said long-spaced electrode system.

References Cited by the Examiner
UNITED STATES PATENTS

| | | | |
|---|---|---|---|
| 2,972,101 | 2/1961 | De Witte | 324—10 X |
| 3,076,138 | 1/1963 | Stelzer | 324—10 X |

WALTER L. CARLSON, *Primary Examiner.*

G. R. STRECKER, *Assistant Examiner.*